3,013,973
BACTERIA INHIBITED SOLUBLE OILS AND
SOLUBLE OIL EMULSIONS
Edward O. Bennett, Houston, Tex., assignor to Texaco Inc., a corporation of Delaware
No Drawing. Filed Dec. 6, 1957, Ser. No. 700,975
7 Claims. (Cl. 252—33.3)

This invention relates to soluble oils and soluble oil emulsions inhibited against bacterial action.

Soluble oils generally are composed of mineral oil or mixtures of mineral and vegetable oils, and an emulsifying agent to lower the interfacial tension between the oil and large volumes of water whereby emulsions of the oil-in-water type may be easily formed. The emulsifying agents commonly used include soaps of petroleum sulfonic acids, naphthenic acids, fatty acids, rosin and tall oil. Soluble oils usually contain coupling agents and small amounts of water to stabilize the composition prior to emulsification. Various lubricant additives are also used to correct or improve certain characteristics of the soluble oil or soluble oil emulsion.

The soluble oil itself is shipped to the user, in a substantially sterile condition. However, bacteria can be introduced in an emulsified soluble oil either through the water used in the preparation thereof or through contamination by the workers or from the air during use. The bacteria, if allowed to grow unchecked, will eventually cause breakdown of the emulsion and curtail the use for which it was intended.

In addition to the above occurrence, a serious odor problem is created by certain bacterial growth in the cutting fluid. It is believed that initially the growth of certain aerobic bacteria takes place with a resulting slight breakdown of the emulsion. During shutdown periods of the cutting machinery, as on weekends and holidays, certain anaerobic sulfate-reducing bacteria grow quickly in the used cutting fluid due to the lack of aeration in the open system and to the conditions or material provided by the prior growth of aerobic bacteria in the fluid. The presence of large amounts of sulfate-reducing bacteria causes severe odor problems due to the formation of sulfides and the odor is particularly noticeable on Monday mornings after weekend shutdown periods. The presence of anaerobic bacteria also causes a quicker and more severe emulsion breakdown than bacteria produced under aerobic conditions necessitating draining and cleaning of the cutting fluid system and the addition of new cutting fluid.

The problem of finding a satisfactory bacterial inhibitor for a soluble oil is made difficult by a number of factors which must be considered. These factors include toxicity, oil solubility, emulsion degradation, additive compatibility and growth inhibition of harmful bacteria for a sufficient period during the life of the oil.

In accordance with the present invention a soluble oil composition which will meet the above requirements contains no more than 1.25 percent by weight of an alkyl mercury phosphate having from 1 to 4 carbon atoms. The preferred compound is ethyl-mercury phosphate and the preferred concentration is 1.25 percent. The lower concentration limit is 0.05 percent. The upper limit is dictated by the solubility of the compound in soluble oils.

The invention also includes a soluble oil emulsion containing from 50 to 1000 parts per million (p.p.m.) of an alkyl mercury phosphate having from 1 to 4 carbon atoms. In this portion of the invention the preferred compound is also ethyl mercury phosphate and the preferred amount is 500 p.p.m.

Other compounds of the invention useful as bactericides include methyl mercury phosphate, n-propyl, mercury phosphate, isopropyl mercury phosphate, n-butyl mercury phosphate and isobutyl phosphate.

The soluble oil-in-water emulsions are formed with water-to-oil ratios ranging from 5:1 to about 100:1. The more dilute emulsions, from 25:1 to 100:1 are preferred for cutting oils which are used as lubricants and coolants in high speed metal turning operations.

The soluble oil mainly comprises a mineral lubricating oil and an emulsifying agent. The mineral oil is preferably a naphthene base distillate oil although mixed paraffin-naphthene base distillate oils are at times effectively employed. Naphthene base distillate fractions are desirable because of their better emulsificatoin properties and stability. In general, refined base oils fractions having an SUS at 100° F. between 70 and 800 are used in the formulation of the soluble oils of this invention.

The emulsifying agents useful in the present invention are those known in the art. Examples of these emulsifiers include oil soluble metal petroleum sulfonates, alkali metal naphthenates, and resinates, salts of fatty and carboxylic acids, such as guanidine salts of high molecular weight fatty acids and alkylolamine salts of carboxylic acids containing at least 10 carbon atoms, alkali metal salts of tall oil, etc. These soaps or salts are usually formed with sodium because of the lower cost and availability, but potassium is also used. Mixtures of emulsifiers, for example a mixture of sodium naphthenate and sodium pertroleum sulfonate, a mixture of sodium resinate, sodium naphthenate and sodium petroleum sulfonate, and a mixture of guanidine stearate and triethanolamine stearate have been found extremely useful.

The total emulsifier concentration is between 10 and 20 percent by weight of the total soluble composition with concentrations between 12 and 16 percent usually employed.

Minor amounts of coupling agents are also advantageously employed in the soluble oil composition to improve the texture and stability thereof. Those coupling agents useful in this invention include mono and polyhydroxy alcohols, ether-alcohols and phenols. Examples of these compounds include ethyl, isopropyl, n-propyl, isobutyl, n-butyl and n-amyl alcohols; ethylene glycol, diethylene glycol and propylene glycol; ethylene glycol alkyl ethers wherein alkyl group has from 1 to 8 carbon atoms, for example ethylene glycol monoethylether (Cellosolve), ethylene glycol monoisopropylether, ethylene glycol monobutylether, ethylene glycol mono-n-pentylether, ethylene glycol mono-n-hexylether, diethylene glycol monoethylether (Carbitol), diethylene glycol monobutylether and cresol. The concentration of the coupling agents in the soluble oils is usually between 0.1 and 1.5 percent by weight. A preferred coupling agent is ethylene glycol monobutylether at a concentration of about 0.6–1.0 percent by weight.

In preparing the soluble oil of this invention a small amount of water is preferably used to make the soluble oil fluid and to prevent oil separation, or stratification of the emulsion, upon mixing the soluble oil with much larger amounts of water. The water content, to stabilize the oil, usually falls between 1 and 4 weight percent. A water content of about 2 percent has been found to be particularly effective in the soluble oil composition.

Other useful lubricant additives, to improve certain characteristics of the soluble oil, are at times used in the composition. These include, for example, rust preventatives such as triethanolamine, extreme pressure and oiliness agents, and settling agents.

The alkyl mercury phosphates can be incorporated in soluble oil up to about 1.25 percent by weight by first dissolving them in either the coupling agent, for example, ethylene glycol monobutylether, or the small amount of water used in the soluble oil formulation and then incorporating the mixture in the oil.

When incorporating the alkyl mercury phosphates in the emulsion, it may be done at the time the emulsion is prepared and before any bacterial problem occurs, or it may be added to the emulsion after a bacterial problem is evident thereby correcting the problem before serious degradation of the emulsion occurs.

In order to determine the value of compounds, known or expected to have bacteria destroying properties in water solutions, as bactericides in soluble oil emulsions, a screening test was used. This test consisted of preparing the cutting fluids or soluble oil emulsions and adding 100, 500, and 1000 p.p.m. of each bactericide to 20 ml. of the emulsion in test tubes. The tubes were then autoclaved at 15 pounds steam pressure for 15 minutes. After the tubes had cooled to atmospheric temperature, 0.5 ml. of a composite used cutting oil sample or inoculum was prepared by mixing the "spoiled" cutting oil samples of several users. The bacterial content of the inoculum was determined and in every case the tubes were inoculated with a standard known number of viable bacteria. Tubes of sterile uninhibited uninoculated emulsions and uninhibited inoculated emulsions were employed as controls. All tubes were placed on a shaking machine making 209 oscillations per minute. Immediately after inoculation of the emulsions and at 24 hour intervals for a period of 7 days, each tube was tested for the presence of viable bacteria by inoculating nutrient broth with a small standard volume of emulsion. The broth tubes were incubated for 48 hours and then examined for bacterial growth. Those bactericides which caused the inoculated emulsions to become sterile within the seven day test period were considered promising and were subjected to further testing. Of over 250 known water soluble bactericides tested in the above manner less than a third were considered promising as bactericides in soluble oils.

Effective materials found with the above test procedure were further tested in an Open System Test. The procedure consisted of placing 3.0 gms. of powdered iron and 3000 ml. of a 25:1 soluble oil emulsion containing the experimental bactericide in a one gallon jar and inoculating with a known quantity of bacteria. The soluble oil consisted of a naphthene base distillate oil having an SUS viscosity at 100° F. of about 72, 7.5 percent sodium resinate, 12.0 percent sodium petroleum sulfonate, 1.0 percent ethylene glycol monobutylether, 0.5 percent triethanolamine and 2.0 percent water. The system was then aerated for 5 days each week. Immediately after inoculation and twice a week thereafter duplicate standard plate counts were made. The inhibitors were considered effective as long as bacteria counts remained less than 1000/ml.

The following table shows the results of the Open System Test on the potential bactericides:

Table I

| | No. of Effective Days of Inhibition | | |
|---|---|---|---|
| | 100 p.p.m. | 500 p.p.m. | 1,000 p.p.m. |
| Sodium o-phenylphenol | | | 32 |
| o-Phenyl phenol | | 32 | 39 |
| Resorcinol | | | 0 |
| Resorcinol dibenzoate | | | 0 |
| Mercuric oleate | 0 | 49 | 63 |
| Alkylamine o-phenyl phenol | 0 | 0 | 0 |
| Mercuric naphthenate | 0 | 4 | 4 |
| Zinc salt of alkyl-n-propylenediamine-pentachlorophenol | | | 0 |
| Pentachlorophenol | | | 0 |
| Mixture of tetradecylamine and o-phenyl phenol | | | 0 |
| Dichlorophene | | 0 | 23 |
| Copper naphthenate, 8% | 0 | 0 | 0 |
| Oxochloramide | 11 | 14 | 21 |
| Mixture of 4 and 6 chloro-2-phenyl phenol | 0 | 0 | 18 |
| Methylene bis-phenol | 0 | 0 | 0 |
| Tetrachlorophenol | 0 | 0 | 0 |
| Dimethylaminomethyl phenol | 0 | 0 | 18 |
| 2,4,6-Tri(dimethylamino-methyl phenol) | | 0 | 18 |
| Beta-propiolactone | | | 26 |
| Diethyl acid pyrophosphate | | 2 | 20 |
| 2-Methyl-1,4-naphthoquinone | | | 26 |
| 2-Phenyl ethylamine | | 8 | 26 |
| Malonic acid | | | 8 |
| 1,2-Dibromo-1,1 dichloroethane | | 0 | 0 |
| Hydroxylamine, HCl sol | 20 | 22 | 26 |
| Mixture of 2,8-diamino-10-methyl acridinium and 2,8-diamino acridine | | | 8 |
| Mixture of 2,8-diamino-10-methyl acridinium and 2,8-diamino acridine, HCl sol | | | 2 |
| m-Dichloroxylenol | | | 36 |
| 10% Phenylmercuric acetate | | 27 | 27 |
| Organic mercurial (Exact chemical composition not known) | | | 22 |
| 1,2-Dichlorohexafluorocyclopentene-1 | | | 0 |
| Cyclohexyl chloride | | | 0 |
| 2-Amino-1,4 naphthoquinone | 10 | 26 | 30 |
| Propyl-p-hydroxybenzoate | | | 8 |
| Butyl-p-hydroxybenzoate | | | 2 |
| Lauryl bromoisoquinolinium | | | 2 |
| Phenylmercuric monoethanolammonium acetate | | | 53 |
| Zinc salt of dimethyl dithiocarbamic acid | | | 26 |
| Phenylmercuriethylenediamine | | 72 | 36 |
| 5-Chloro-2-phenyl mercurioxy benzoic acid | 26 | | |
| 4-Phenylmercuric-3,5-dichlorobenzoic acid | 78 | 69 | |
| 3,5-Dibromo-2-phenyl mercurioxy benzoic acid | | 69 | 83 |
| Sodium salt of dibromohydroxy mercuric fluorescein (mercurochrome) | | 9 | 31 |
| Phenyl mercuric salicylate | | 15 | 15 |
| 1-Hydroxy-2-pyridinethione (zinc salt) | | | 9 |
| 1-Hydroxy-2(1H)-pyridinethione (copper salt) | | | 13 |
| Morpholine silicofluoride | | | 2 |
| Rosin amine silicofluoride | | | 2 |
| Ethyl mercury phosphate | 415 | 630+ | 630+ |

The above data conclusively show the exceptional bacterial inhibiting effect of ethyl mercury phosphate under aerobic conditions. The fact that aerobic growth is destroyed by the bactericide ensures the inhibition of anaerobic growth since, as earlier stated, the conditions or material provided by prior aerobic growth is necessary for later growth of anaerobic sulfate reducing bacteria.

Obviously, many modifications and variations of the invention, as hereinbefore set forth, may be made without departing from the spirit and scope thereof, and therefore only such limitations should be imposed as are indicated in the appended claims.

I claim:
1. An improved soluble oil comprising an emulsifiable mineral lubricating oil and 0.05–1.25 percent by weight, sufficient to inhibit the growth of bacteria in the said oil, of an alkyl mercury phosphate having from 1 to 4 carbon atoms.

2. An improved soluble oil as described in claim 1 wherein the alkyl group is ethyl.

3. An improved soluble oil emulsion comprising an emulsifiable mineral lubricating oil and water in a ratio from 1:5 to 1:100, respectively, and a bacteria inhibiting amount, in the range 50–1000 parts per million of the said emulsion, of an alkyl mercury phosphate having from 1 to 4 carbon atoms.

4. An improved soluble oil emulsion as described in claim 3 wherein the alkyl group is ethyl.

5. An improved soluble oil emulsion consisting essentially of from 5 to 100 parts of water to about 1 part of a soluble oil composition consisting essentially of a major portion of a mineral lubricating oil and from 10 to 20 percent by weight of an oil-in-water emulsifying agent; and from 50 to 1000 parts per million of an alkyl mercury phosphate having from 1 to 4 carbon atoms.

6. An improved soluble oil emulsion consisting essentially of from about 25 to 100 parts of water to about one part of a soluble oil composition consisting essentially of a major proportion of a naphthene base distillate oil having an SUS viscosity range at 100° F. of 70 to 800, from 10 to 20 percent by weight of an alkali metal salt of a compound selected from the group consisting of naphthenic acid, sulfonic acid, rosin and mixtures thereof, from 0.1 to 1.5 percent by weight of a coupling agent selected from the group consisting of monohydroxy alcohols, polyhydroxy alcohols, ether-alcohols, phenols and mixtures thereof, and from about 1 to 4 percent by weight of water; and from 50 to 1000 parts per million of alkyl mercury phosphate having from 1 to 4 carbon atoms.

7. An improved soluble oil emulsion consisting essentially of from about 25 to 100 parts of water to about 1 part of a soluble oil composition consisting essentially of a major proportion of a naphthene base oil having an SUS viscosity at 100° F. of from 70 to 800, from 12 to 16 percent by weight of a sodium salt of a compound selected from the group consisting of naphthenic acid, sulfonic acid, rosin and mixtures thereof, from 0.1 to 1.5 percent by weight of an ethylene glycol alkyl ether wherein the alkyl group has from 1 to 8 carbon atoms and from about 1 to 4 percent by weight of water; and about 500 parts per million of ethyl mercury phosphate.

References Cited in the file of this patent

UNITED STATES PATENTS 2,653,909  Frazier ---------------- Sept. 29, 1953
2,780,598  Cafcas ---------------- Feb. 5, 1957

OTHER REFERENCES

"Disinfection of Soluble Oil Emulsions," by Pivnick et al., Lub. Eng., March 1957, pages 151–153.

"Handbook of Material Trade Names," by Zimmerman et al., 1953 Ed., page 334.